United States Patent [19]

Vollmerhausen

[11] Patent Number: 5,016,309

[45] Date of Patent: May 21, 1991

[54] LATERAL ACCESS RIVER TRANSIT SYSTEM

[76] Inventor: Robert H. Vollmerhausen, 1809 Anderson Road, Falls Church, Va. 22043

[21] Appl. No.: 228,443

[22] Filed: Aug. 5, 1988

Related U.S. Application Data

[63] Continuation-in-part of Ser. No. 59,602, Jun. 8, 1987, abandoned.

[51] Int. Cl.$^5$ .............................................. E02C 5/00
[52] U.S. Cl. ..................................... 14/71.7; 14/71.3; 114/231; 114/249
[58] Field of Search ..................... 14/69.5, 71.1, 71.3, 14/71.7, 70, 69; 414/137.9, 138.2, 584; 114/231, 249, 250

[56] References Cited

U.S. PATENT DOCUMENTS

| | | | |
|---|---|---|---|
| 571,547 | 11/1896 | Weeks | 114/231 X |
| 2,489,869 | 11/1949 | Dunn | 414/584 |
| 2,798,620 | 7/1957 | Allan | 14/69.5 X |
| 4,000,714 | 1/1977 | Colin | 114/249 X |
| 4,309,956 | 1/1982 | Yamaguchi | 114/249 |
| 4,458,620 | 7/1984 | Bingham | 14/69.5 X |

FOREIGN PATENT DOCUMENTS 424324  2/1935  United Kingdom ................ 114/231

*Primary Examiner*—Bruce M. Kisliuk
*Assistant Examiner*—Matt Smith

[57] ABSTRACT

An interconnection apparatus between a riverboat and a shuttleboat is disclosed that provides for the equalization of the vertical distances between the deck surfaces of the riverboat and a shuttleboat docked alongside. An uppermost and a lowermost docking member functions to adhere the respective hulls in close proximity one to another while a sensor sub-assembly, 'reads' the displacement of the shuttleboat hull in the water and communicates this data to an on-board control system that, in turn, actuates a number of hydraulic lifters. As the respective deck elements of the riverboat and the shuttleboat(s) are equalized, sliding doors are opened on the shuttleboat and the riverboat allowing pedestrian traffic to move, en mass from one vessel to another. Subsequent to the re-activation of the doors, as the respective doors are closed, the elevating deck descends to thereby allow passengers to move freely about the riverboat/-shuttleboat vesseles, to thereby complete the transfer process.

7 Claims, 3 Drawing Sheets

LATERAL ACCESS RIVER TRANSIT SYSTEM

This application is a continuation-in-part of application Ser. No. 07/059,602, filed June 8, 1987, now abandoned.

FIELD OF INVENTION

The present invention relates to mass transit facilities and more especially to a water mode of travel utilizing riverboats and supplemental shuttleboats that bond to the riverboat, while underway, to effect a transfer of passengers to and from the shuttleboats to the riverboat.

More particularly, the present invention relates to a means for ingress and exit of passengers from the shuttleboat, to the riverboat and further for a means for elevating a portion of riverboat decking to facilitate the safe, level, convenient footing necessary as passengers embark and disembark from one vessel to the other.

BACKGROUND TO THE INVENTION

There is a long felt need to find economical, safe, and efficient alternative transportation means. The need to develop these alternatives is critical in light of present day congestion and related environmental factors assoicated with the automobile.

One of the recurring areas that are most in need of alternative transportation solutions is the daily grind, over relatively short, but highly congested highways, to and from work. The present invention is one such alternative.

The present invention relates to a means for providing a convenient, safe, and economical arrangement of elements so as to facilitate the unimpeded movement of passengers through the transit system.

In operation, there is a continuing variation in the displacement of the shuttleboat, over the waterline. Displacement, or how high or low the shuttleboat rides in the water is predicated on its loading, how many passengers, how much fuel or, in the case of hydrofoil boats, whether or not the shuttlecraft is planing on its hydrofoils or down on its hull.

These factors and more function to establish the exact height of the finish deck level over the water and, by extension, function to establish the vertical gradient between the decking of the shutle-boat and that of the ship to which it docks.

A separate, but functionally interrelated objective, is that of providing fast, safe exit and ingress means for the passengers so as to facilitate the flow of people to and from the vessels. The manner and arrangement of the elements in the present invention functions to provide both a means for ingress and exit, of large numbers of people, with an elevating means for the leveling of the respective decking elements.

A further, but fundamental factor is safety. In this respect it is necessary to have the device operate with a degree of precision, essentially leveling the respective decking elements to within close vertical tolerances; and, to thereby avoid 'tripping steps,' such as would be caused by slight differences in the elevation of the respective surfaces.

SUMMARY OF THE INVENTION

An objective of the invention is to provide a means for large numbers of passengers to enter and exit a shuttleboat/riverboat combination quickly, efficiently, conveniently and safety.

Another object of the invention is to provide means for elevating the riverboat companion decking so as to provide a level flooring surface for pedestrain foot traffic.

A still further object is to provide means for vertically adjusting the elevating riverboat decking so as to faciliate the movement of passengers around the riverboat itself, such as to moving to other decks. These and other objectives of the invention reside in the elements thereof and in the co-operative arrangements of the parts as will hereinafter be more fully described and claimed.

DESCRIPTION OF THE DRAWING

FIG. 1 also illustrates the lateral mounting thereto of a plurality of docking members, the elements of which is integral to the operation of both the ingress/exit means and the deck elevating means of the invention.

DESCRIPTION OF THE PREFERRED EMBODIMENT

Figure 1:
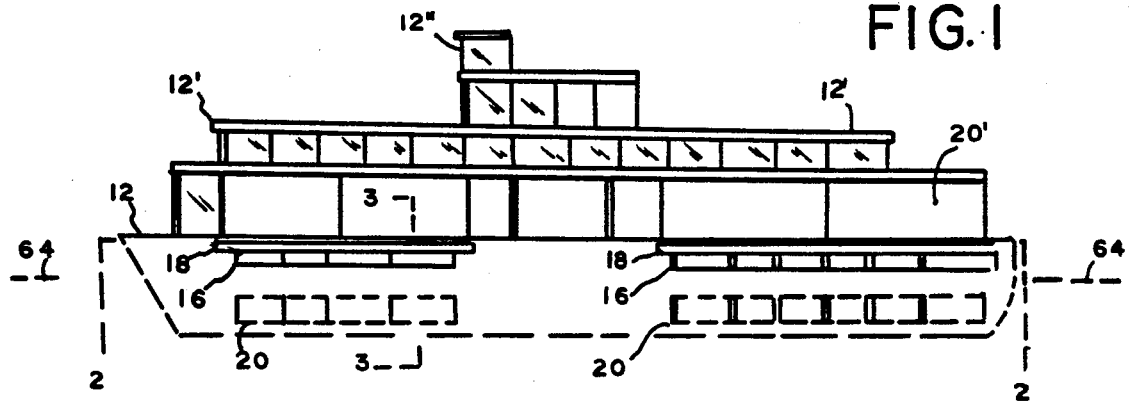
FIG. 1 is an elevation view showing a riverboat of shallow draft and flat bottom design such as in typical of riverboats such as may be found on the Mississippi River.

Referring now to the drawing in which like numerals represent like elements throughout, apparatus 10 can be seen to include a riverboat 12 having a shallow draft, broad beamed hull and a super-structure 12' and bridge 12" as shown in FIG. 1.

Figure 2:
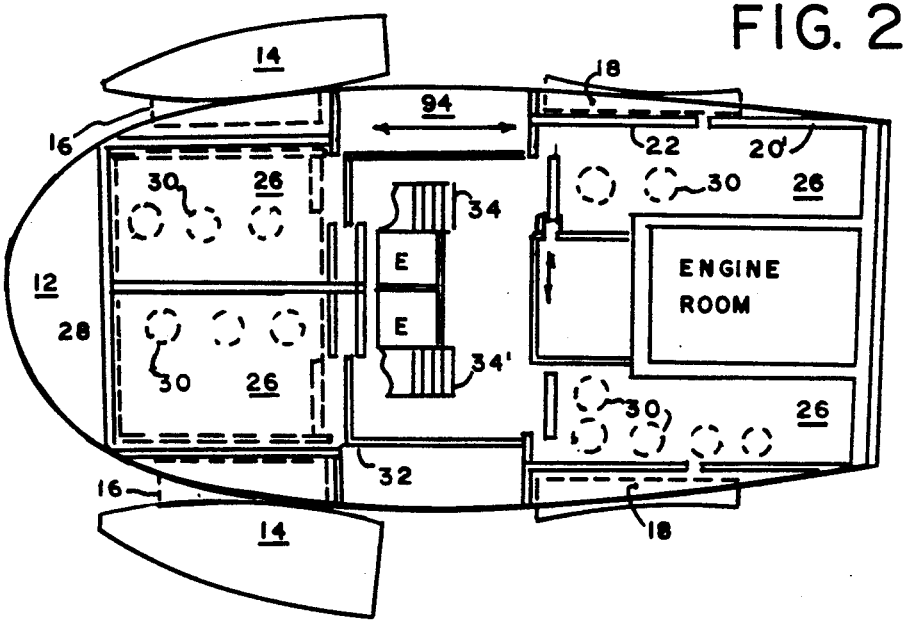
FIG. 2 is a plan view illustrating a riverboat having two shuttleboats alongside, docked and further having capacity for two additional shuttleboats astern; the riverboat, in the preferred embodiment, having capacity for docking four shuttleboats at one time.

Superstructure 12' extends substantially to the outer reaches, the beam ends, of hull 12 and has a plurality of sliding doors or partitions 20' that are 'hung' from overhead suspension elements (not shown), the doors 20' slidably disposed from a closed position adjacent a shuttleboat 14 to a open position 94 as illustrated in FIG. 2. The interior of superstructure 12 being partitioned substantially as shown with stairs and elevators (E) leading to upper decks; doors 32 leading out of elevating means 26 as deck level 24 is leveled with stationary decking on ship 12.

A series of accessory, non-movable walls or partitions 22 extend longitudinally fore and aft to substantially extend the length of ship 12. Partitions 22 in combination with partitions 28 define spaces within which elevator means 26 is vertically disposed. Bulkhead partitions 22/28 provide structural support for elevating means 26.

Superstructure 12' has a height 'h', the value of which is application dependent that is determined by calculating the range of values of a vertical gradient, from low to high, that would be encountered between the passenger elevation of a shuttleboat 14 and the elevation of the elevating means area(s) 26. The value of 'H' then being sufficient to allow elevating means to rise or lower as needed to position the finish deck level with the finish deck level of shuttleboat 14 when the shuttleboat has been secured to the riverboat 12. The mechanism by which this deck segment is positioned level with the flooring of the shuttleboat is described more fully hereinafter.

Figure 3:
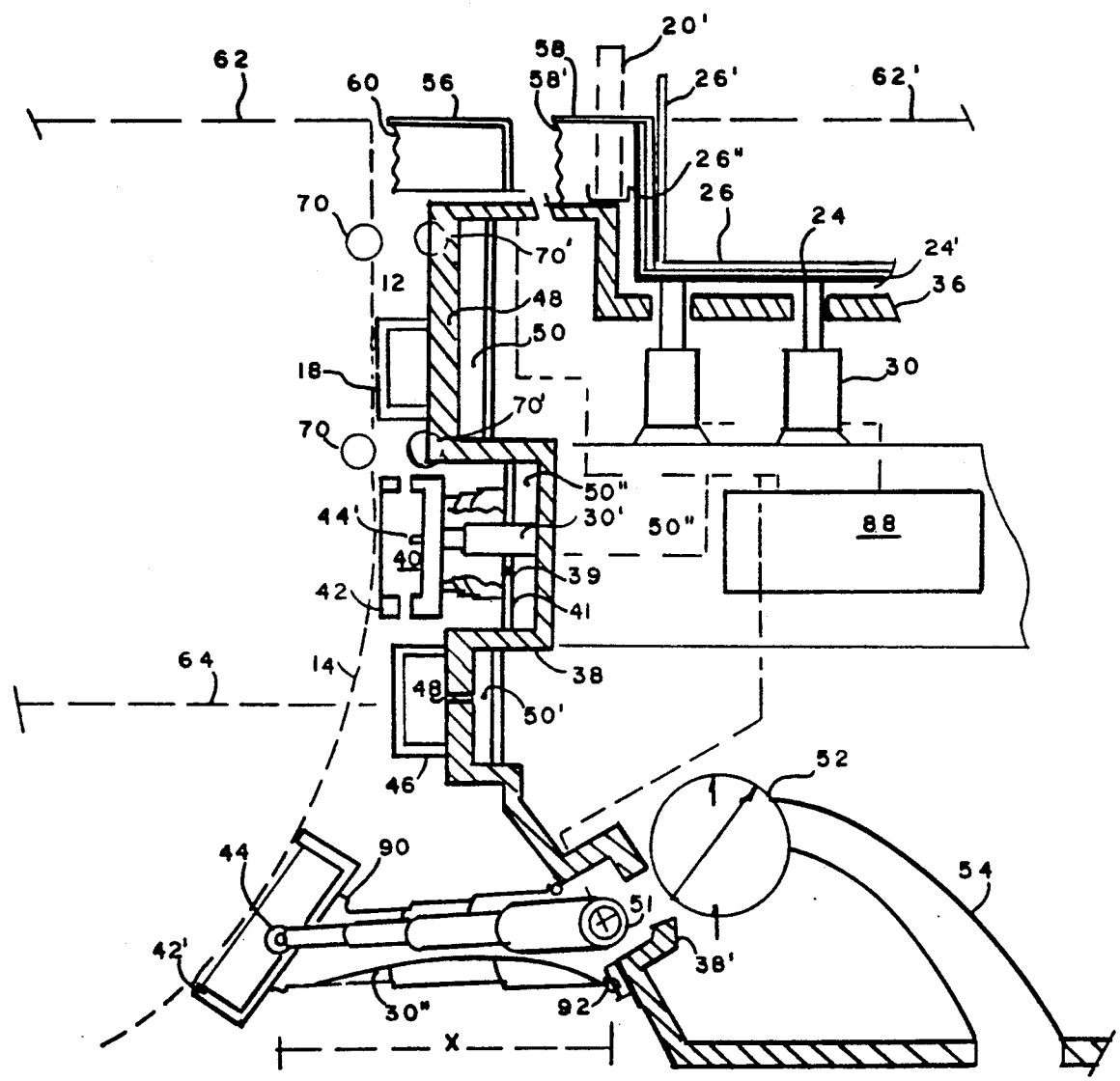
FIG. 3 is a cross-sectional view, taken along line 3—3 of FIG. 2 that illustrates an uppermost docking member and a lowermost docking member, a hull configuration and elements of the riverboat deck elevating means.
Figure 5:
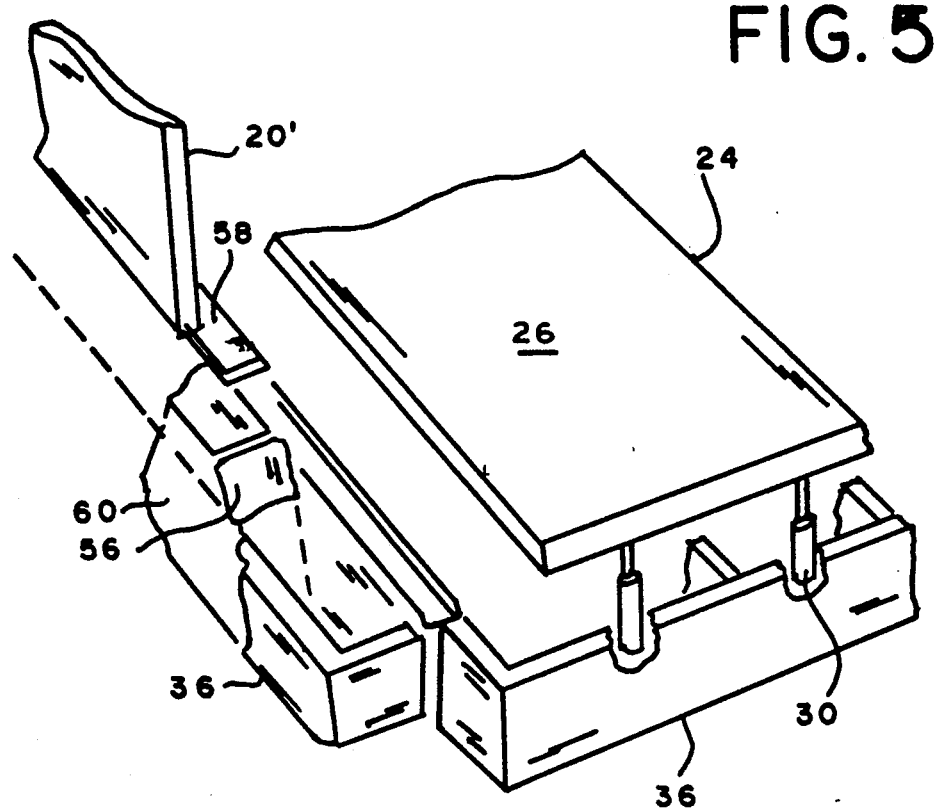
FIG. 5 is a perspective view of the deck elevating means that also illustrates a typical track, sliding door and supplemental elevating means that elevates concurrently with the elevating deck to provide thereby a substantially continuous footing for pedestrains using the river transit system.

With reference to FIG. 3, it can be seen that apparatus 10 includes an uppermost docking element 42 and a lowermost docking element 42', the uppermost and lowermost docking elements having hydraulic actuators 44' and 44 respectively that position docking elements 42/42' against hull 14 as the docking sequence is undertaken.

Uppermost docking element 42 is above waterline 64 and operates pneumatically by a negative air pressure valved through sleeve 1, the air being drawn from ambient air through orifices 39 in docking element 42. Negative air is channeled through hull passage 50" and thence through passages 50, 50' for subsequent conditioning and ventilation, by any conventional means, into elevating means 26 for passenger health and comfort.

Lowermost docking element 42' is hydrostatically driven, establishing a venturi area of negative pressure acting against the curvature of hull 14, as does docking element 42, acting pneumatically. Docking element(s) 42/42' are pivotably mounted on the outer reaches of each respective hydraulic arm, but while uppermost docking element actuator 30' is mounted stationary within a concaval hull section 38, reinforced by wall element 39, lowermost craddle element actuator 30" is elevationally pivoted through a limited range of motion from zero degrees to the horizontal to plus or minus 35 degrees. Hydraulic arm meter element 51 is recessed into hull section 38'.

Both uppermost and lowermost docking elements are recessable into a respective hull section to avoid damage thereto as the riverboat 12 is berthed or must navigate locks. Uppermost docking element 42 recesses into concaval hull section 41 while lowermost docking element 42' recesses into concaval hull section 38'. Hull section 48 is a support element for bumper element 46/46' that extends convexally, functioning as a protective protrudance for concaval hull sections 38/38' and further defining within themselves passages 50/50' for the conduction of air therethrough from one part of the hull 12 longitudinally to another part.

In lowermost docking element 42', as water is pumped through, the water is drawn through tubelike telescoping element 40 that pivots on mounting element(s) 92 that is attached to hull section 38'. A flexible element 90 induces the induction of water close to hull 14, adjacent to craddle element 42'. Water thus drawn, by pump/motor 52 is pumped out through discharge pipe 54 on the bottom of hull 12.

(Water thus pumped out a bottom discharge is known, in some instances, to cause a slight reduction in the co-efficient of drag of the vessel's hull and thus to improve fuel economy.)

Figure 4:
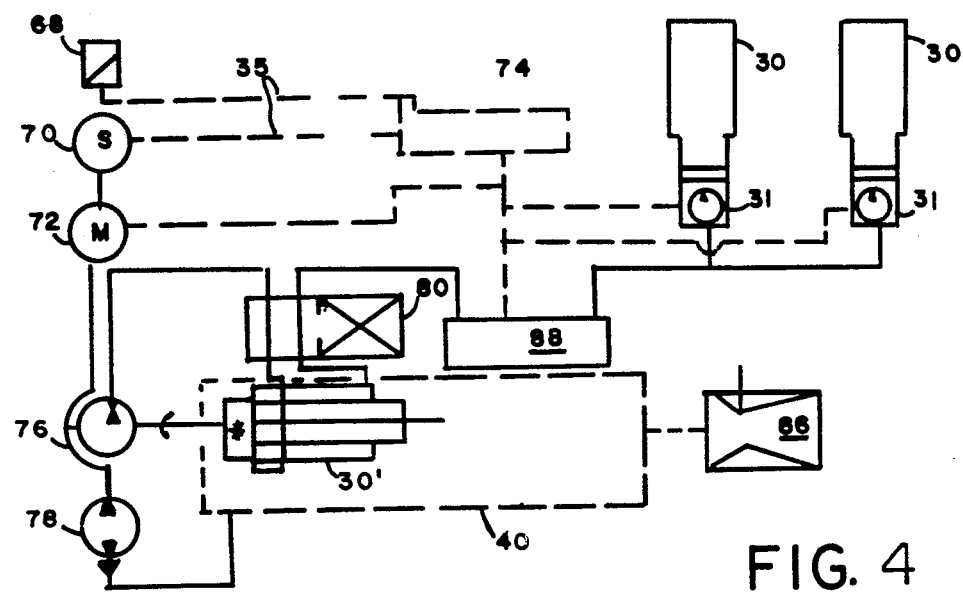
FIG. 4 is a fluid power simplified schematic that illustrates the basic functional arrangements between the elements of the invention, such as a sensor assembly, a control curcuit and a plurality of servo-mechanisms that actuate hydraulic lifters under the elevating deck.

In the docking operation, as the hulls are positioned adjacent one to another, circuitry 35 relays input signals from sensor(s) 70 to control curcuit 74 as shown in FIG. 4. Circuit 74 activates pump motor 72 that actuates vacuum pump 78. Air is withdrawn through outer sleeve element 40 and a venturi effect 86 as is symbolically shown in FIG. 4, is generated partially due to the withdrawal of air between the hull surfaces and also partially due to the curvilinear configuration of the hull.

A distance of actuator 30" extension X is calculated by an on-board control curcuit (not shown). The calculation is based on the amount of hydraulic fluid pumped into element 38' before actuator 30" encounters hull 14. As hull 14 biases to docking element 42', the extension of actuator arm 30" ceases and the amount of fluid metered through meter element 51, at that time, is communicated electronically to the control network 74 as illustrated in fluid flow chart, FIG. 4.

As the actual distance x is measured by the fluid used in actuator arm 30", and as the configuration of hull, the curvature radius, is known and is included within the data base on the riverboat on-board control system, the specific, point to point correspondance between the shuttleboat hull and the riverboat hull is calculated.

The objective of the calculation is to establish the existing displacement of the shuttleboat, the elevation of the deck with respect to the elevation of the riverboat deck. As docking proceeds, and as a bond is established between the two hulls by the partial vacuum, the application of negative air pressure on the hull surfaces, both vessels are underway, proceeding parallel one to another.

Uppermost docking element is pneumatic while lowermost docking element is hydrostatically driven. Reasons for this are twofold: First, it provides for two independent mechanisms, each working in its respective fluid, i.e., air or water. This provides a higher degree of operational safety to compensate for unexpected disturbances in the air, such as a gale force, sufficient to impede the operation of uppermost docking element 42.

Uppermost docking element area 16, and lowermost craddle area 20, as shown in FIG. 1 are application dependent in that the total areas are calculated by the size of the shuttleboats (the weight) to be secured to the riverboat 12, and further by a survey of the wind and water conditions under which the system is to operate; that is, the higher average wind conditions, the larger must be the areas 16/20 to compensate for the additional wind loading on the respective hulls of the vessels. Bumper elements 46/18 cushion any movement with respect to the hulls as docking elements 42/42' secure the shuttleboat to the riverboat hull. Bumper elements 46/46' include an overhang element 18, as shown in FIG. 1, that is made of any suitable cushioning material, such as flexible rubber. As the docking progresses, the control system 74, FIG. 4, calculates the dynamic elevation of the shuttleboat—as both vessels are in motion and as the shuttleboat may have hydrofoils, the hydrodynamic lift generated by the hydrofoils, even at relatively low speeds, such as ten to fifteen knots, will provide a small co-efficient of hull lift that must be accounted for in the apparatus if both deck levels are to be made equal in elevation. Therefore, hull curvature is the first 'feedback' criteria that is calculated by the extension of hydraulic actuator(s) 30"; that is, the further 'under' the shuttleboat vessel that the actuator must extend to bias against it, the higher in the water the shuttlecraft is riding. Each extension position then collates to an approximate position on shuttleboat hull 14.

Uppermost and lowermost docking elements then provide two functions; first, a securing function of biasing one hull against the other, and secondly, of providing data input to an on-board control system 74 for calculating the elevation of shuttleboat 14 in the water. This provides, however, only a first calculation as differences in actual hull configurations will translate into different elevational readings.

Sensor apparatus 70/70' is embedded within hull structure 14 and hull structure 12. Sensor apparatus 70/70' may be any conventional sensing mechanism such as photoelectric relays or pressure sensitive switches such as to provide electrical input, in a paired array, as shown in FIG. 3.

As uppermost docking element and lowermost craddle element establish a bonding to hull 14, the resultant fluid meter generated data input to the control system provides a range of elevational values. The control system establishes a lower and upper limit to the elevations based on data generated as a result of the uppermost and lowermost docking element positioning on the shuttleboat hull.

With the range of values established, a format is established within which the readings, or paired input from the sensors may be positioned and a second calculation on the relative elevation of shuttleboat hull with respect to the riverboat hull 12 is generated within the control system.

As the data from both the metering apparatus 51 and the sensor array 70/70' is communicated to control curcuit 74, servo elements 31, mounted on hydraulic lifter elements 30 are actuated. Fluid is pumped from tank 88 to hydraulic lifter elements 30 that are arrayed under floor element 24 of elevating means 26.

Elevating means 26, rests on hull bulkhead elements 36 when at rest. As servo elements 31 actuate, hydraulic lifters 30 extend upwardly, under program control, through floor apertures 24'.

As elevating means 26 is displaced upwardly, supplemental elevating means 56 is actuated, in conjunction with elevating means 26. As control 74 actuates, hydraulic fluid is pumped from tank 88 to cavity 58' to effect an equal elevational displacement to elevating means 26. As supplemental elevating means 56 is displaced upwardly, upper surface 18, as shown in FIG. 2, is raised equal to the calculated elevation of hull 14.

Supplemental elevating means 56 has folding element 60 disposed longitudinally thereto such as to unfold, vertically, as hydraulic fluid is pumped into cavity 58'. Plate element 58 is pivotably mounted on supplemental elevating means 56 and extends between supplemental elevating means 56 and elevating means outer wall element 26' so as to 'ledge' on the outer wall element to effectively cover sliding door guide track 26", preventing reactuation of the moveable partition, the upper surface elevation of plate 18 being nearly identical to the elevation of elevating means 62' and to the elevation 62 of a shuttleboat 14.

Supplemental elevating means 56 has folding elements 60 disposed vertically between hull support 36 and plate 58 so as to provide an expanding member as hydraulic fluid is pumped into cavity 58'.

An override switch, manual control, is provided in control system 74 to accommodate any unusual circumstances, allowing safety operators to manually position the elevating means as needed for the safe, unimpeded transfer of passengers.

In launching a shuttleboat away from the riverboat, hydraulic motor 78 is actuated that extends hydraulic accumulator 30' outward that has docking element 42 disposed on the outer reaches thereof. Hydraulic valve 80 is under the control of curcuit 74 and as the air pump and hydraulic pump are both reversible positive air is valved through sleeve element 40 and hydraulic accumulator 30' is withdrawn as the shuttleboat is launched from the riverboat 12.

It will be apparent that the objects and advantages of the invention have been accomplished. The foregoing should be considered as illustrating the principles of the invention and further, since numerous modifications and changes will readily occur to those skilled in the art, it is not desired to limit the invention to the exact construction and operation shown and described, and accordingly, all suitable modifications and equivalents which may be resorted to fall within the scope of the invention.

What is claimed is:

1. A river transit apparatus, comprising a vacuum actuated means for biasing at least one shuttleboat hull to a riverboat hull, said vacuum actuated biasing means having elevating means disposed therewith, said shuttleboat hull having as least one deck member disposed therewith, said riverboat having a plurality of deck members, each one of said riverboat deck members having said elevating means disposed therewith, said elevating means having control means, whereby as said riverboat and said shuttleboat are respectively biased one to the other, and as said elevating means is actuated, at least one of said riverboat deck members is leveled with said shuttleboat deck member.

2. A river transit apparatus, comprising a means for biasing a shuttleboat hull to a riverboat hull, said biasing means having an elevating means disposed therewith, said riverboat having a plurality of deck members, said shuttleboat hull having at least one deck member, each one of said riverboat deck members having said elevating means disposed therewith, said elevating means having control means, said biasing means includes an uppermost docking element and a lowermost docking element, said lowermost docking element having means for extension from said riverboat, said control means having means for metering said extension means, as said extension means is actuated, said control means actuates said elevating means, whereby as said riverboat and said shuttleboat are respectively biased one to the other, as as said elevating means are actuated, at least one of said riverboat deck members are leveled with said shuttleboat deck member.

3. A river transit apparatus as recited in claim 2 wherein said biasing means includes an uppermost docking element and a lowermost docking element, each one of said uppermost docking element having means for pneumatic actuation, each one of said lowermost docking element having means for hydrodynamic actuation whereby as said biasing means is actuated, said shuttleboat hull is biased to said riverboat hull pneumatically and hydrostatically.

4. A river transit apparatus as recited in claim 3 wherein said riverboat having supplemental elevating means, said supplemental elevating means being integral to said elevating means of said riverboat hull, said control means actuating said supplemental elevating means as said elevating means is actuated whereby said supplemental elevating means actuates in conjunction with said elevating means.

5. A river transit apparatus as recited in claim 2 wherein said elevating means includes at least one moveable partition, at least one of said moveable partitions being disposed adjacent said elevating means and adjacent said supplemental elevating means, at least one of said moveable partitions being disposed between said elevating means and said supplemental elevating means, said supplemental elevating means being actuated as said moveable partition is actuated, whereby as at least one of said moveable partitions is actuated, said supplemental elevating means prevents said moveable partition from inadvertent reactuation.

6. A river transit apparatus as recited in claim 1 wherein said biasing means includes a lowermost docking elements, said lowermost docking elements having pivot means disposed therewith whereby as said biasing means is actuated said docking element is matingly disposed to said shuttleboat hull.

7. A river transit apparatus as recited in claim 1 wherein said riverboat hull includes a concaval and a convexal hull configuration whereby said biasing means is recessed into said riverboat hull.

* * * * *